(12) United States Patent
Myhre et al.

(10) Patent No.: US 10,512,109 B2
(45) Date of Patent: Dec. 17, 2019

(54) TRANSMITTING COMMUNICATION DEVICE, RECEIVING COMMUNICATION DEVICE AND METHODS PERFORMED THEREBY

(71) Applicant: Telefonaktiebolaget LM Ericsson (publ), Stockholm (SE)

(72) Inventors: Elena Myhre, Järfälla (SE); Gunnar Mildh, Sollentuna (SE); Walter Müller, Upplands Väsby (SE); Göran Rune, Linköping (SE); Jari Vikberg, Järna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 186 days.

(21) Appl. No.: 15/523,671

(22) PCT Filed: Jan. 15, 2016

(86) PCT No.: PCT/SE2016/050022
§ 371 (c)(1),
(2) Date: May 1, 2017

(87) PCT Pub. No.: WO2017/123127
PCT Pub. Date: Jul. 20, 2017

(65) Prior Publication Data
US 2018/0124854 A1    May 3, 2018

(51) Int. Cl.
*H04W 76/10* (2018.01)
*H04W 4/70* (2018.01)
*H04W 84/04* (2009.01)

(52) U.S. Cl.
CPC ............. *H04W 76/10* (2018.02); *H04W 4/70* (2018.02); *H04W 84/042* (2013.01)

(58) Field of Classification Search
CPC ....... H04W 4/70; H04W 76/10; H04W 76/02; H04W 84/042
(Continued)

(56) References Cited

U.S. PATENT DOCUMENTS

| 2014/0056243 A1 | 2/2014 | Pelletier et al. |
| 2016/0044002 A1* | 2/2016 | Ying .................. H04W 4/70 |
| | | 713/168 |

FOREIGN PATENT DOCUMENTS

EP    2592789 A1    5/2013

OTHER PUBLICATIONS

Nakao a et al: "Application and Device Specific Slicing for MVNO", 2014, 1st NPL dated May 1, 2017 with 5 pages.*
(Continued)

*Primary Examiner* — Jianye Wu
(74) *Attorney, Agent, or Firm* — Patent Portfolio Builders, PLLC

(57) ABSTRACT

A method performed by a transmitting communication device for handling communication for a wireless device in a communication network. The communication network comprises one or more networks comprising partitioned sets of functionalities wherein a first set of functionalities belongs to a first network slice supporting the wireless device, and which first set of functionalities is separated from another set of functionalities out of a total set of functionalities in the one or more networks. The transmitting communication device transmits a Non Access Stratum Protocol Data Unit (NAS PDU) and an indication over a signalling connection carrying NAS PDUs, to a receiving communication device, which indication indicates that the NAS PDU is associated with the first network slice.

30 Claims, 13 Drawing Sheets

(58) Field of Classification Search
USPC .......................................................... 370/328
See application file for complete search history.

(56) References Cited

OTHER PUBLICATIONS

International Search Report and Written Opinion for International Application No. PCT/SE2016/050022, dated Sep. 12, 2016, 17 pages.
A. Nakao et al., "Application and Device Specific Slicing for MVNO," Oct. 28, 2014, 5 pages, First International Science and Technology Conference (Modern Networking Technologies), IEEE.
3GPP TR 22.891, "3rd Generation Partnership Project; Technical Specification Group Services and System Aspects; Feasibility Study on New Services and Markets Technology Enablers; Stage 1, (Release 14)," Nov. 2015, 96 pages, v1.2.0, 3GPP Organizational Partners.
"Network Functions Virtualization and Software Management," Dec. 2014, 10 pages, Ericsson White Paper, Uen 284 23-3248, downloaded from http://www.ericsson.com/res/docs/white papers/network-functions-virtualization-and-software-management.pdf.
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Sep. 2015, 334 pages, v13.4.0, 3GPP Organizational Partners.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages, v13.1.0, 3GPP Organizational Partners.
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)," Dec. 2015, 507 pages, v13.0.0, 3GPP Organizational Partners.

\* cited by examiner

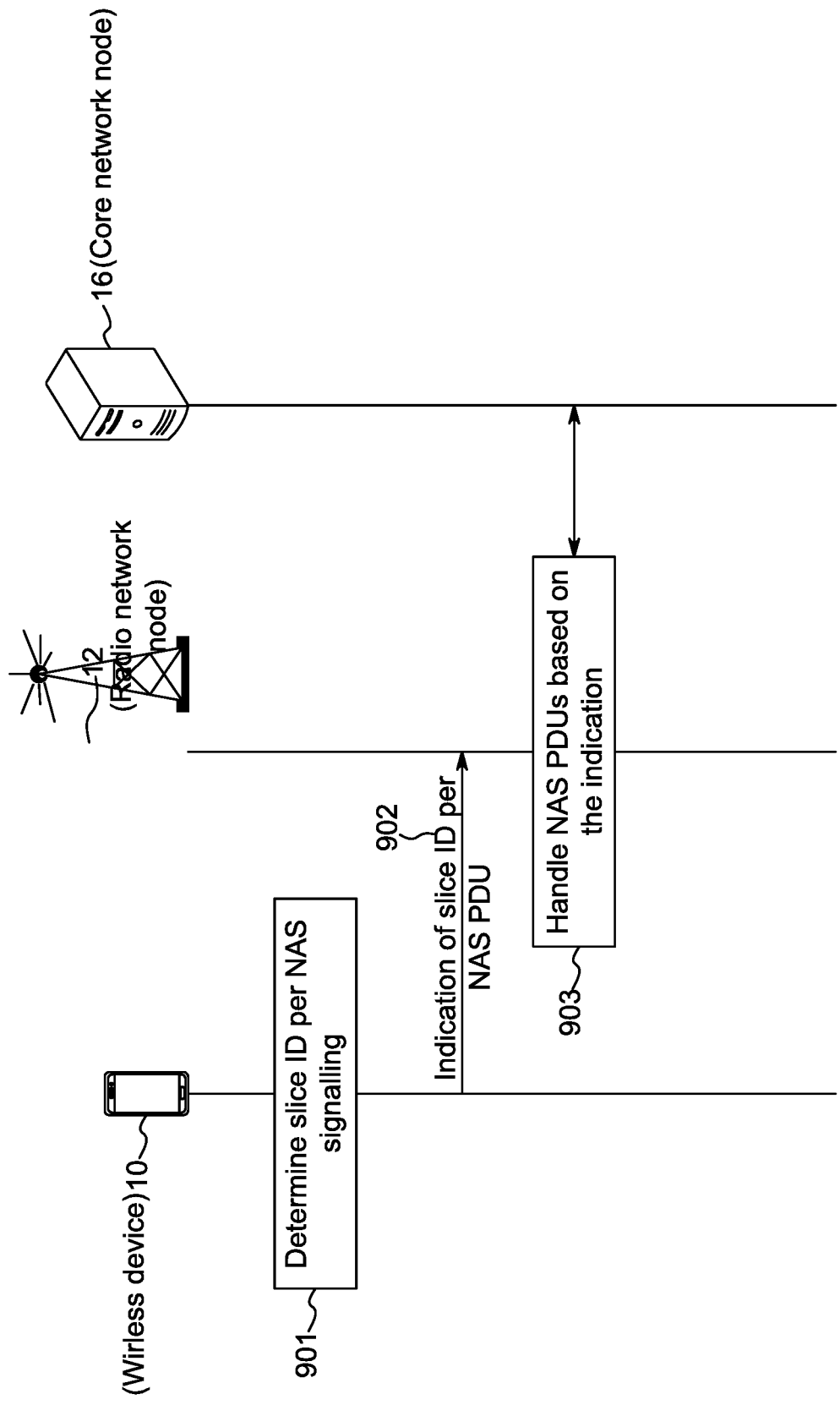

TRANSMITTING COMMUNICATION DEVICE, RECEIVING COMMUNICATION DEVICE AND METHODS PERFORMED THEREBY

CROSS-REFERENCE TO RELATED APPLICATIONS

This application is a National stage of International Application No. PCT/SE2016/050022, filed Jan. 15, 2016, which is hereby incorporated by reference.

TECHNICAL FIELD

Embodiments herein relate to a transmitting communication device, receiving communication device and methods performed thereby. Furthermore, a computer program and a computer readable storage medium are also provided herein. In particular, embodiments herein relate to handling communication for a wireless device in a communication network.

BACKGROUND

In a typical communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC) in GSM, which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane signaling between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management function e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.

Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in same or different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. An INITIAL CONTEXT SETUP RESPONSE message is sent by eNB to the MME confirming the setup.

Current assumption is that the RAN-CN split is similar for 5G as for 4G, implying an (evolved) S1 interface.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater for performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated for example in roles such as Virtualized MME (vMME), Virtualized PCRF (vPCRF), Virtualized S-GW (vS-GW) or Virtualized PDN-GW (vPDN-GW).

NFV is seen as an enabler for network slicing that is described herein.

When looking at the wide range of applications and use cases that are to be addressed with a 5G network, it is quite obvious that these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the existence of a physical infrastructure it is much easier to instantiate another Packet Core instance for the business expansion than to set up a new parallel infrastructure or even integrated nodes.

Low risk by no/limited impact on legacy: As the new instance is logically separated from the other network slices, the network slices can also provide resource isolation between each other. Thus introduction of a new isolated network slice will not impact the existing operator service and therefore only provide low risk.

Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices.

Optimized use of resources: Today the network is supporting many different services but with new use cases and more diverging requirements there is a need for optimize the network for the specific type use case. Network slicing allows to match services to optimized network instances, and it also allows for a more optimized use of those specific resources.

Allows for individual network statistics: With service specific network slices and possibly even on the level of individual enterprises, there is a possibility of collecting network statistics specific for a limited and well defined group of users of the network slice. This may not be the key driver for slicing but rather a benefit that may be a useful tool.

Slicing can also be used to isolate different services in an operator's network. Future networks are expected to support new use cases going beyond the basic support for voice services and mobile broadband currently supported by existing cellular network, e.g. 2G/3G/4G. Some example use cases include:
Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of:
Enterprise services
Government services, e.g. national and/or public safety
Verticals industries, e.g. automation, transportation
Residential users These different users and services are also expected to put new requirements on the network. FIG. 5 shows an example of a network slicing for a case when there exist different network slices in the core network for MBB, Massive MTC and Critical MTC. In other words, the network slices may comprise separate core network instances supporting the different network slices.

This is a new concept that applies to both LTE and new 5G RAT. The key driver for introducing network slicing is business expansion, i.e. improving the cellular operator's ability to serve other industries, e.g., by offering connectivity services with different network characteristics (performance, security, robustness, and complexity).

The current working assumption is that there will be one shared Radio Access Network (RAN) infrastructure that will connect to several Evolved Packet Core (EPC) instances, one EPC instance per network slice. As the EPC functions are being virtualized, it is assumed that the operator shall instantiate a new Core Network (CN) when a new slice should be supported. This architecture is shown in FIG. 5. Slice 1 can for example be a Mobile Broadband slice and Slice 2 can for example be a Machine Type Communication network slice and Slice 3 may be for MTC critical devices. Network slicing introduces the possibility that the network slices are used for different services and use cases and there is a need to enable usage of this mechanism for wireless devices in the communication network to improve the performance of the communication network.

SUMMARY

An object of embodiments herein is to provide a mechanism for improving performance of the communication network in an efficient manner.

According to an aspect the object is achieved by a method performed by a transmitting communication device for handling communication for a wireless device in a communication network. The communication network comprises one or more networks comprising partitioned sets of functionalities wherein a first set of functionalities belongs to a first network slice supporting the wireless device. The first set of functionalities is separated from another set of functionalities out of a total set of functionalities in the one or more networks. The transmitting communication device transmits a Non Access Stratum Protocol Data Unit (NAS PDU) and an indication over a signalling connection carrying NAS PDUs, to a receiving communication device. The indication indicates that the NAS PDU is associated with the first network slice.

According to another aspect the object is achieved by a method performed by a receiving communication device for handling communication for a wireless device in a communication network. The communication network comprises one or more networks comprising partitioned sets of functionalities wherein a first set of functionalities belongs to a first network slice supporting the wireless device, and which first set of functionalities is separated from another set of functionalities out of a total set of functionalities in the one or more networks. The receiving communication device receives from a transmitting communication device, a NAS PDU and an indication over a signalling connection carrying NAS PDUs. The indication indicates that the NAS PDU is associated with the first network slice. The receiving communication device handles the received NAS PDU taking the received indication into account.

According to yet another aspect the object is achieved by providing a transmitting communication device for handling communication for a wireless device in a communication network. The communication network comprises one or more networks comprising partitioned sets of functionalities wherein a first set of functionalities belongs to a first network slice supporting the wireless device, and which first set of functionalities is separated from another set of functionalities out of a total set of functionalities in the one or more networks. The transmitting communication device is configured to transmit a NAS PDU and an indication over a signalling connection carrying NAS PDUs, to a receiving communication device. The indication indicates that the NAS PDU is associated with the first network slice.

According to still another aspect the object is achieved by providing a receiving communication device for handling communication for a wireless device in a communication network. The communication network comprises one or more networks comprising partitioned sets of functionalities wherein a first set of functionalities belongs to a first network slice supporting the wireless device. The first set of functionalities is separated from another set of functionalities out of a total set of functionalities in the one or more networks. The receiving communication device is configured to receive from a transmitting communication device, a NAS PDU and an indication over a signalling connection carrying NAS PDUs. The indication indicates that the NAS PDU is associated with the first network slice. The receiving communication device is further configured to handle the received NAS PDU taking the received indication into account.

It is furthermore provided herein a computer program comprising instructions, which, when executed on at least one processor, cause the at least one processor to carry out any of the methods above, as performed by the network node or the wireless device. It is additionally provided herein a computer-readable storage medium, having stored thereon a computer program comprising instructions which, when executed on at least one processor, cause the at least one processor to carry out the method according to any of the methods above, as performed by the network node or the wireless device.

Embodiments herein introduce an efficient manner of enabling sliced network structuring and usage by making it possible to e.g. prioritize the signalling carried over e.g. the Uu interface Signalling Radio Bearers (SRB) or signalling associations on the S1 interface differently. For example in a network slicing scenario realized by having slice-specific NAS signalling, it may be useful for the receiving communication device to be able to associate different signalling with different slices, hence potentially apply different priorities for the different signallings. By providing the receiving communication device with knowledge of the association between the NAS PDUs and the network slice the receiving communication device may handle received NAS PDUs in a more efficient manner leading to an improved performance of the communication network.

BRIEF DESCRIPTION OF THE DRAWINGS

Embodiments will now be described in more detail in relation to the enclosed drawings, in which:

FIG. 9a is a combined flowchart and signalling scheme according to embodiments herein;

DETAILED DESCRIPTION

As part of developing embodiments herein a problem has first been identified. A management system may comprise a domain manager (DM), also referred to as the operation and support system (OSS) node managing the radio network nodes. A DM may further be managed by a network manager (NM). The radio network nodes may be interfaced by X2 and/or S1 interfaces, whereas an interface between two DMs is referred to as Itf-P2P. The management system may configure the radio network nodes, as well as receive observations associated with features in the radio network nodes. For example, DM observes and configures radio network nodes, while NM observes and configures DM, as well as the radio network nodes via DM. By means of configuration via the DM, NM and related interfaces, functions over the X2 and S1 interfaces can be carried out in a coordinated way throughout the RAN, eventually involving the Core Network, i.e. MME and S-GWs.

As part of the evolution of LTE based systems into future generation mobile networks, the concept of network slicing is being developed. Network slicing defines, realizes and operates end-to-end logical networks by means of dedicated and/or shared resources in the Core Network and/or the Radio Access Network and associated management system(s). Embodiments herein make it possible to prioritize the signalling carried over the Signalling Connections such as Signalling Radio bearers (SRB) or signalling associations on the S1 interface e.g. S1 bearers, differently. For example in a network slicing scenario realized by having slice-specific NAS signalling, it may be useful for the RAN to be able to associate different signalling with different slices, hence potentially different priorities.

In the current RRC (3GPP TS 36.331) protocol, only coarse differentiation of the signaling can be done, by the existence of SRB0, SRB1 and SRB2, but no differentiation can be applied for example within e.g. SRB2 that carries NAS Protocol Data units (PDU) once the RRC connection is established, as there is today only one type of NAS PDUs. By the introduction of network slicing and the possibility for one wireless device to be connected to multiple slices and CN instances, embodiments herein provide means to distinguish different NAS PDUs from each other over an air interface as well as a CN-RAN interface according to embodiments herein.

Figure 1:
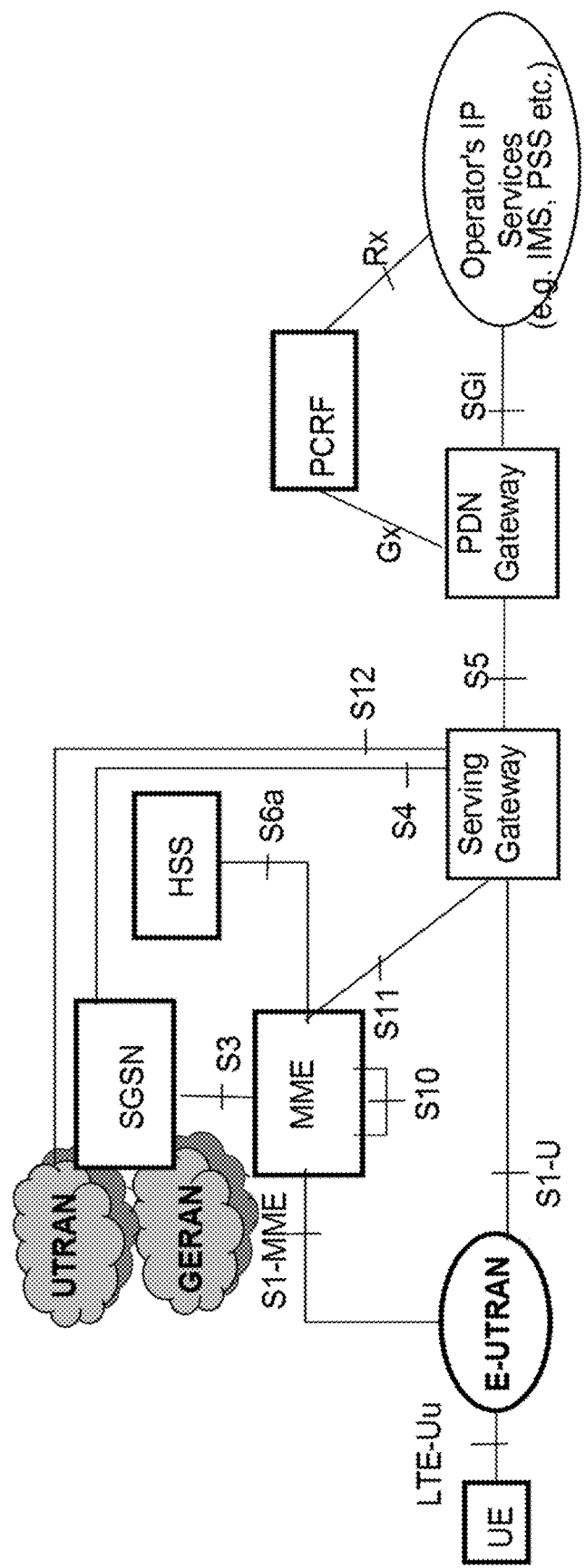
FIG. 1 is a schematic overview depicting a communication network according to prior art.
Figure 2:
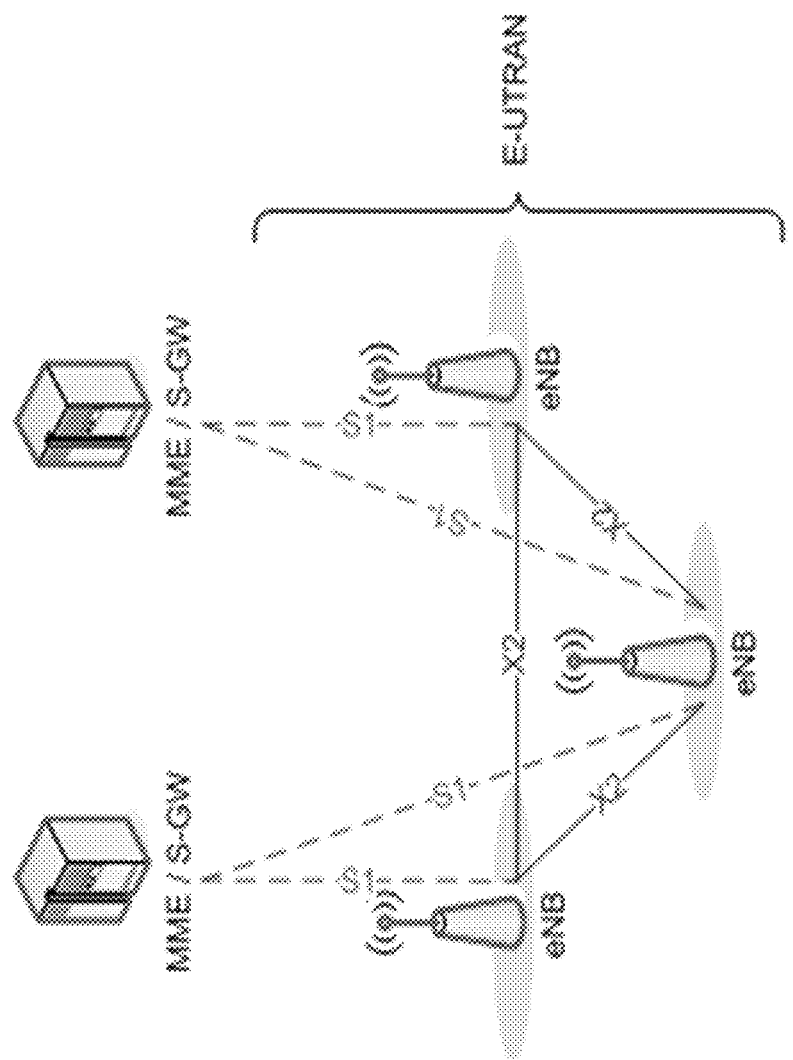
FIG. 2 is a schematic overview depicting a radio access network in connection with a core network.
Figure 3:
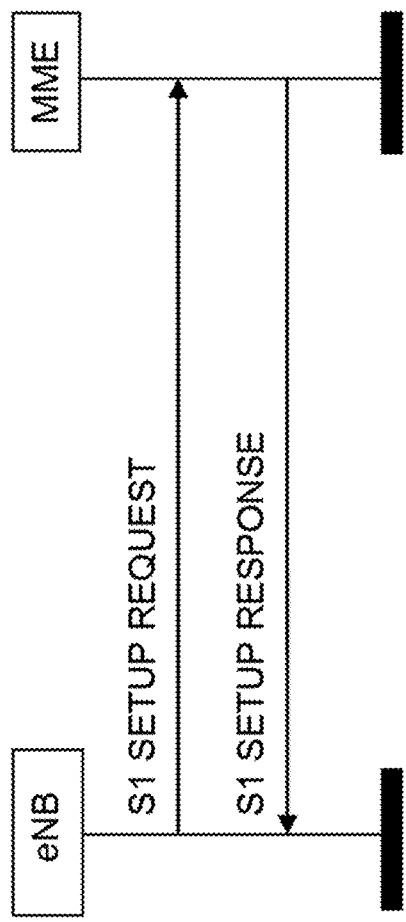
FIG. 3 is a signalling scheme according to prior art.
Figure 4:
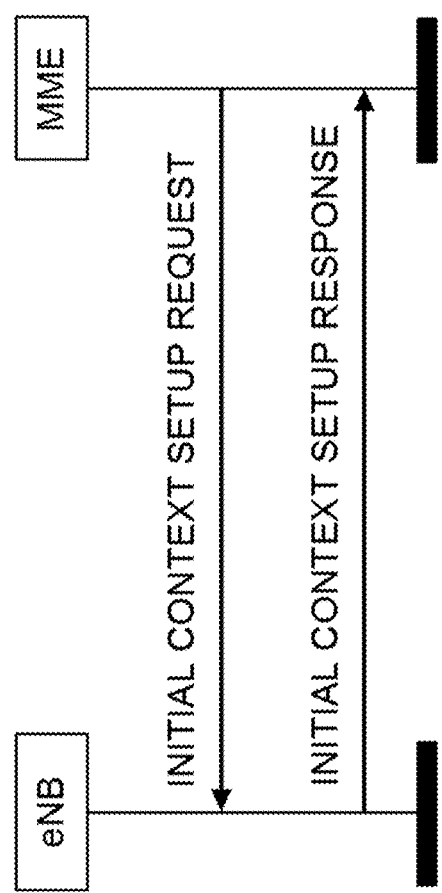
FIG. 4 is a signalling scheme according to prior art.
Figure 5:
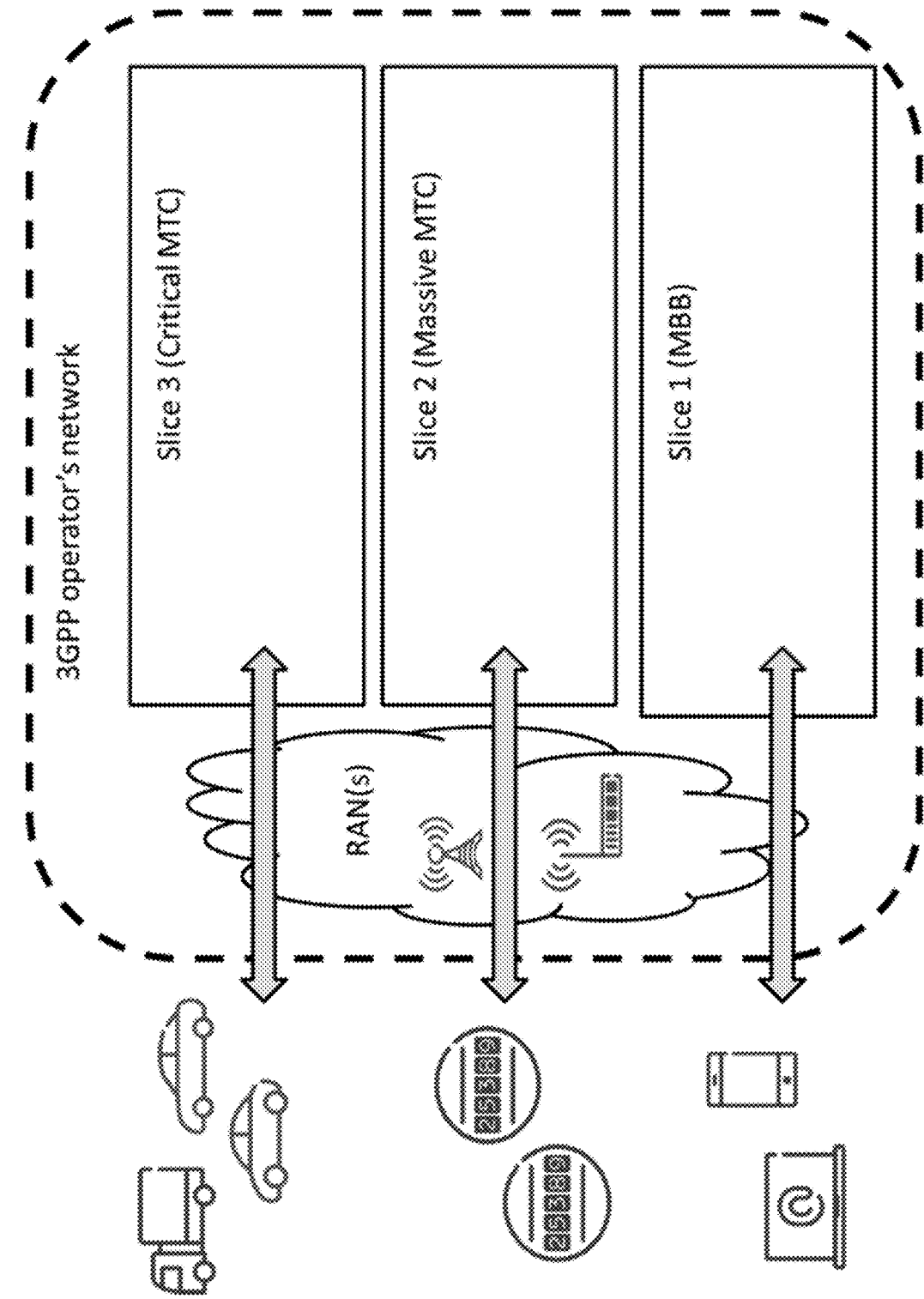
FIG. 5 is a schematic overview depicting an example of network slicing with slice specific core network instances according to prior art.
Figure 6:
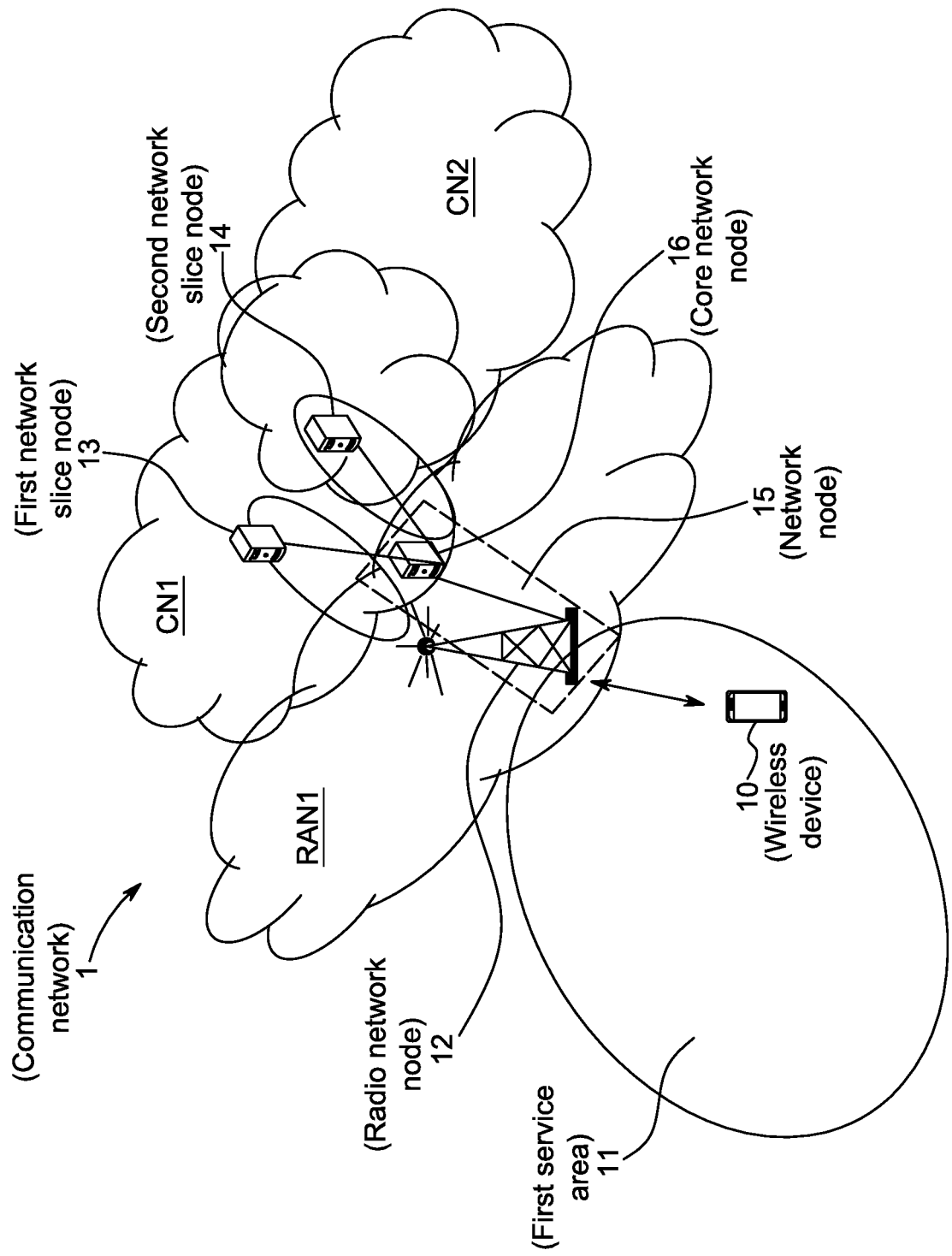
FIG. 6 is a schematic overview depicting a communication network according to embodiments herein.

Embodiments herein relate to communication networks in general. FIG. 6 is a schematic overview depicting a communication network 1. The communication network 1 comprises RANs, e.g. first RAN RAN1, and CNs, e.g. first CN, CN1, and second CN, CN2. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a radio network node 12 providing radio coverage over a geographical area, a first service area 11, of a radio access technology (RAT), such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the radio access technology and terminology used. The radio network node 12 is comprised in a first radio access network (RAN1) of a first network.

Furthermore, the first network comprises one or more CNs e.g. a first core network (CN1), and a second core network (CN2). The first network is virtually network sliced into a number of network slices, the CN1, CN2 and/or the RAN1 may be virtually network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 13. A second network slice for e.g. MBB devices may comprise a second network slice node 14. Each network slice supports a set of functionalities out of a total set of functionalities in the communication network. E.g. the first network slice node 13 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core network or RAN of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physical separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 13 supports the first set of functionalities out of the total set of functionalities in the first network of the communication network, which first set of functionalities belongs to the first network slice of the first network, and is separated from another set of functionalities out of the total set of functionalities in the first network.

The first network comprises one or more network nodes 15, such as a core network node 16 e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. The network node 15 may further be a radio access network node such as the radio network node 12.

In the communication network 1 the network node 15 and the wireless device 10 communicates in Uplink (UL) communications from the wireless device 10 to the network node 15 over an air interface and/or a CN-RAN interface, and in Downlink (DL) communications to the wireless device 10 from the network node 15 over the air interface and/or the CN-RAN interface. Thus, the wireless device 10 may in some scenarios be a transmitting communication device 110 and in some scenarios a receiving communication device 112. Similarly, the network node 15, such as the radio network node 12 or the core network node 16, may in some scenarios be the receiving communication device 112 over the air interface or the CN-RAN interface and in some scenarios be the transmitting communication device 110 over the air interface or the CN-RAN interface.

Embodiments herein introduce the transmitting of extra information, an indication, over a signalling connection(s) carrying NAS PDUs. The signalling connection may be established between the RAN and the CN such as a signalling association on the S1 interface and the indication may be transmitted over a CN-RAN interface such as an S1-MME interface, in e.g. a S1AP protocol. The signalling connection may be established between the wireless device 10 and the RAN such as a SRB and the indication may be transmitted over a wireless device-RAN interface such as an LTE-Uu interface, in e.g. a RRC protocol. The indication indicates the network slice the NAS PDU is associated with so that the receiving communication device 112 can distinguish multiple NAS streams in a same SRB belonging to separate network slices of packet switched network(s) supported by the same or different logical entities in the CN. The NAS PDUs may carry NAS information concerning mobility management, authentication, session management or similar. The embodiments herein describe how specifically the indication is added to the air interface signalling. Differentiation of NAS PDUs belonging to different network slices is thus herein introduced over the air interface, e.g. 4G or 5G air interface, and/or the CN-RAN interface e.g. S1 interface, so that it becomes available to the receiving communication device 112, e.g. the core network node 16, the radio network node 12 or the wireless device 10. This indication may be used for several different things e.g.:

- The indication may be used to provide priority treatment e.g. based on pre-configured policies related to different network slices in UL and/or DL
- The indication may be used for routing NAS PDUs transmitted over a single signaling radio bearer (SRB) over the air interface to different S1 connections associated with different slices in UL
- The indication may be used in the RAN for logging the amount of signaling traffic to, in UL, different slices which can be useful for performance management, policy control/enforcement, protection against overload in one slice affecting other slices etc.

It should be noted that hereby it is not relevant whether in the wireless device 10 and in the CN there may be multiple NAS protocol instances, one per network slice, or one NAS protocol instance serving multiple network slices. In both cases there is a need for the receiving communication device 112 to distinguish NAS PDUs belonging to different network slices if the NAS PDUs are sent within the same signalling connection.

The method of differentiating NAS PDUs, which are sent over the same signalling connection, appears attractive over e.g. defining multiple signalling connections for multiple slices or slice groups, as network slices may have to be added or removed to the network over time, possibly in a quite dynamic way, hence creating signalling connections for the purpose of slicing is not considered feasible. Instead, embodiments herein propose to add this differentiation within the signalling connection, existing or which may be defined by 3GPP in the future for any reason.

Embodiments herein may be applied in different cases of network slicing. It applies both for the case when the wireless device 10 is connected to a single network slice and to the case when the wireless device 10 is connected to multiple network slices simultaneously. Two examples are described for the case when the wireless device 10 is connected to multiple network slices.

Figure 7:
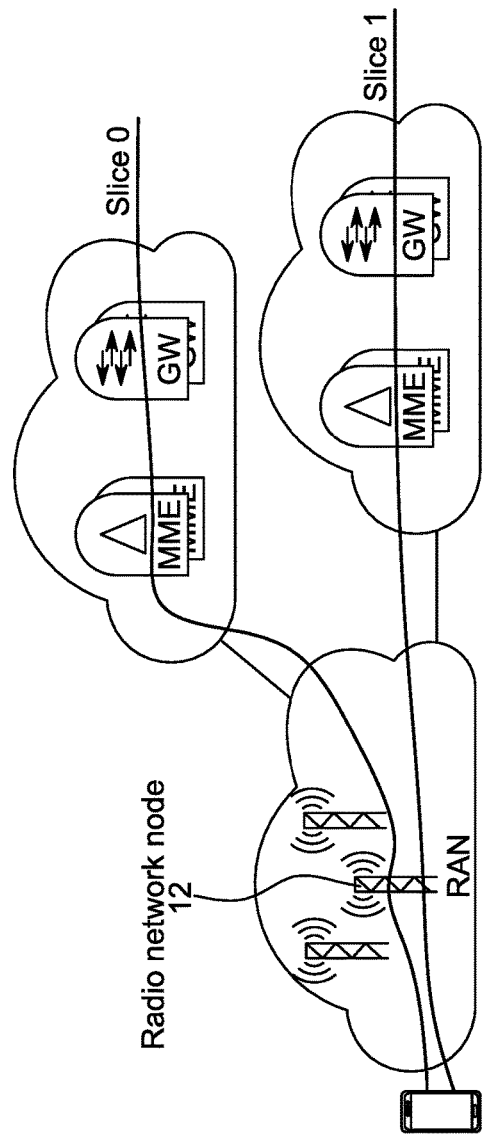
FIG. 7 is an overview depicting a communication network with network slices supported by different core network instances according to embodiments herein.

FIG. 7 shows the case when the different network slices contain totally separate core networks, being packet switched networks. This means that separate NAS-entities exist for the different network slices, as there is one separate core network node, e.g. one MME, in each network slice terminating the NAS signaling from the wireless device 10. The receiving communication device 112 such as the radio network node 12 distinguishes NAS PDUs, e.g. by intercepting the packets, from the wireless device 10 to e.g. route the NAS PDUs to the different network slices, slice 0 and slice 1. Additionally, the receiving communication device 112 may be the wireless device 10 distinguishing NAS PDUs in DL from the radio network node 12 or the core network node 16, thus being examples of the transmitting communication device 110. The receiving communication device 112 may also be the radio network node 12 distinguishing NAS PDUs in DL from the core network node 16, thus being an example of the transmitting communication device 110.

Figure 8:
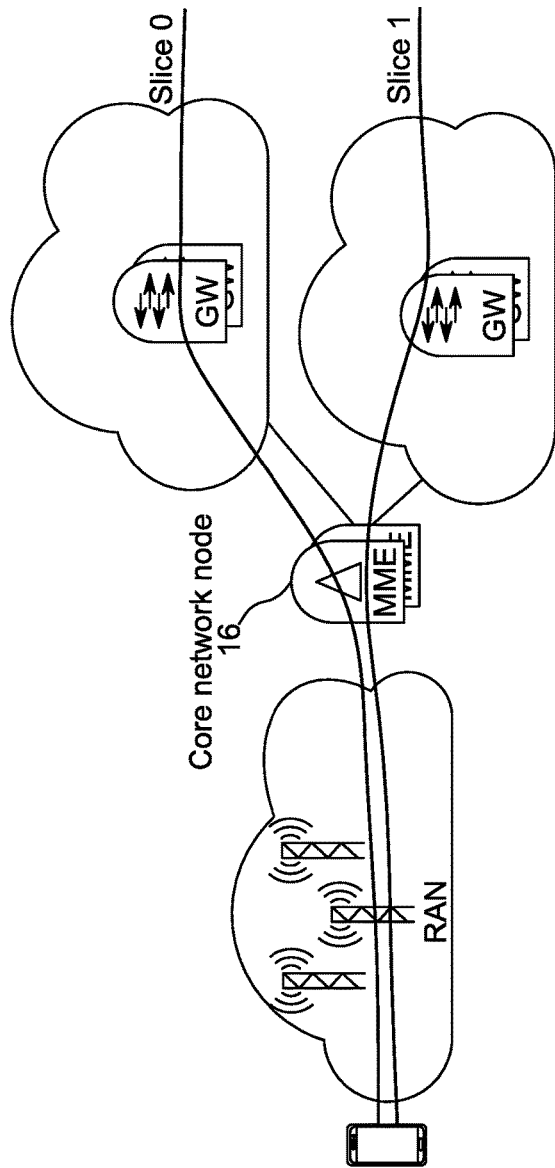
FIG. 8 is an overview depicting a communication network with network slices supported by at least partly shared core network instances according to embodiments herein.

FIG. 8 shows the case when the different network slices share a core network node being part of the core network. The core network node 16 shared by the different network slices may be an MME, or parts of the MME. This means that a single NAS-entity exists for the different network slices, as there is one single core network node, such as the MME, terminating the NAS signaling from the wireless device 10. The receiving communication device 112 such as the core network node 16 e.g. subset of an MME, distinguishes NAS PDUs from the wireless device 10 or the radio network node 12 to e.g. route the NAS PDUs to the different network slices, slice 0 and slice 1. This applies for the case when parts of the NAS-signalling is forwarded from the core network node 16 shared to the slice specific core network instances. Additionally, the receiving communication device 112 may be the radio network node 12 distinguishing NAS PDUs in DL from the core network node 16, thus the core network node 16 being an example of the transmitting communication device 110. Furthermore, the indication may be transmitted over the air interface in UL as well as in the DL between the radio network node 12 and the wireless device 10.

FIG. 9a is a combined flowchart and signaling scheme according to embodiments herein. In this example, the transmitting communication device 110 is exemplified as the wireless device 10 and the receiving communication device 112 is exemplified as the radio network node 12.

Action 901. The wireless device 10 may determine that a NAS PDU is associated with the first network slice.

Action 902. The wireless device 10 then adds information, the indication, to a message e.g. an RRC message, which indication indicates the association between the NAS PDU and the first network slice. Hence, the indication is added to enable the differentiation of the NAS PDUs at the receiving radio network node 12. The NAS signaling may be performed as part of the establishment of the RRC connection. The indication may be called "Additional-NAS-indication". This indication is transmitted to the receiving radio network node 12. The semantics of the "Additional-NAS-indication" may comprise one or more of the following:

The indication may be represented by a priority level;

The indication may be represented by a Slice ID or any other identifier associated with the wireless device 10 being connected to one or multiple Core Network, i.e. NAS, instances due to network slicing;

The indication may be represented by a description of the service/services the NAS association in question is mapped to; and The indication to be exchanged over the Uu interface between the radio network node 12 and the wireless device 10 may be constructed by the radio network node 12 on the basis of other information acquired from the wireless device 10 or from the Core Network node 16 during connection setup/reconfiguration. For example, the radio network node 12 acquires Slice ID/NAS Type/Slice-specific UE ID via S1 or via RRC during RRC Connection establishment/S1 association establishment and allocates the indication, e.g. a specific (new) NAS identifier, to be used between the radio network node 12 and the wireless device 10 over SRBs. This may be done to minimize the overhead on the SRBs, as the Slice ID/NAS Type/Slice-specific UE IDs may be too long to be practical for usage over the radio interface. Such ID also only needs to be unique within a specific RRC Connection.

Action 903. The radio network node 12 may then handle received NAS PDUs based on the received indication. There are different possibilities how the receiving communication device 112 such as the radio network node 12 may handle an "Additional-NAS-indication" used over the air interface, i.e. in the uplink. The receiving communication device 112 may use it in internal handling e.g. if different priorities may impact which internal resources are used. The receiving communication device 112 may also use the indication to decide when to send a specific NAS PDU towards e.g. the CN. In addition, the indication may also be mapped to transport QoS to be used when transmitting the NAS PDU towards e.g. a core network node.

Figure 9B:
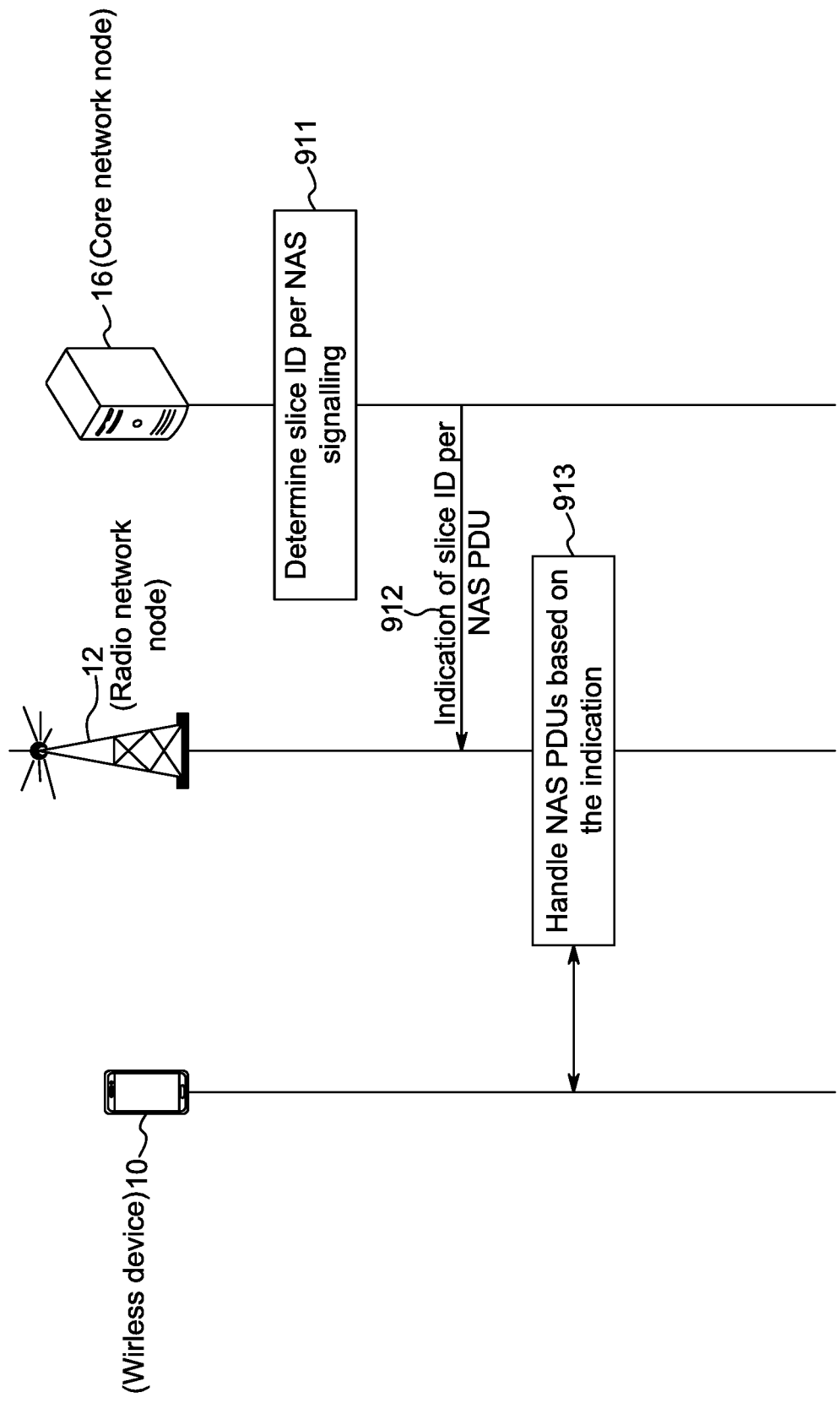
FIG. 9b is a combined flowchart and signalling scheme according to embodiments herein.

FIG. 9b is a combined flowchart and signaling scheme according to embodiments herein. In this example, the transmitting communication device 110 is exemplified as the core network node 16 such as the MME and the receiving communication device 112 is exemplified as the radio network node 12.

Action 911. The core network node 16 may determine that a NAS PDU is associated with the first network slice.

Action 912. The core network node 16 then adds information, the indication, to a message e.g. an S1-AP message, which indication indicates the association between the NAS PDU and the first network slice. Hence, the indication is added to enable the differentiation of the NAS PDUs at the receiving radio network node 12. The NAS signaling may be performed after the establishment of the RRC connection. The indication may be called "Additional-NAS-indication". This indication is transmitted to the receiving radio network node 12. The semantics of the "Additional-NAS-indication" may comprise one or more of the following:

- The indication may be represented by a priority level;
- The indication may be represented by a Slice ID or any other identifier associated with the wireless device 10 being connected to one or multiple Core Network, i.e. NAS, instances due to network slicing;
- The indication may be represented by a description of the service/services the NAS association in question is mapped to; and The indication to be exchanged over the CN-RAN interface between the core network node 16 and the radio network node 12 and may be constructed by the core network node 16 on the basis of other information acquired from the Core Network and/or the radio network node 12/wireless device 10 during connection setup/reconfiguration. For example, the core network node 16 acquires Slice ID/NAS Type/Slice-specific UE ID via S1 during S1 association establishment and allocates the indication, e.g. a specific (new) NAS identifier, to be used between the core network node 16 and the radio network node 12 over CN-RAN interface. This may be done to minimize the overhead on e.g. signalling associations on the S1 interface, as the Slice ID/NAS Type/Slice-specific UE IDs may be too long to be practical for usage over the CN-RAN interface. Such ID also only needs to be unique within a specific S1 Connection. In another alternative, the core network node 16 may construct the indication based on information received from another core network node such a core network node in a network slice specific core network instance.

Action 913. The radio network node 12 may then handle received NAS PDUs based on the received indication. There are different possibilities how the radio network node 12 may handle an "Additional-NAS-indication" used over the CN-RAN interface, e.g. in the downlink. The radio network node 12 may use it in internal handling e.g. if different priorities may impact which internal resources are used. The radio network node 12 may also use the indication to decide when to send a specific NAS PDU towards e.g. the wireless device 10. Hence, in sending of one NAS-PDU from the core network node 16 to the wireless device 10, the radio network node 12 may take the both roles of receiving and transmitting communication device. In addition, the indication may also be mapped to transport QoS to be used when transmitting the NAS PDU towards the wireless device 10.

Figure 10:
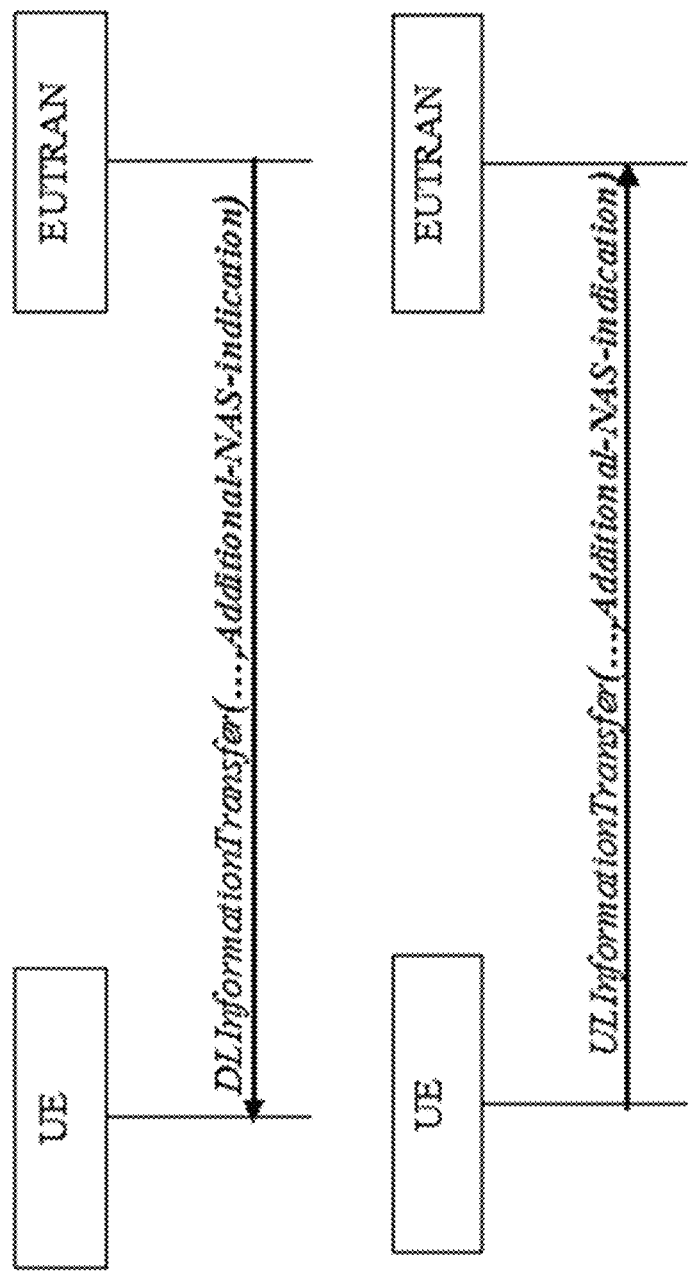
FIG. 10 are signalling schemes according to embodiments herein.

The "Additional-NAS-indication" may be conveyed in the Access Stratum as an addition to the RRC Direct Transfer messages, i.e. the DLInformationTransfer and ULInformationTransfer messages, see FIG. 10. FIG. 10 shows wherein a RRC protocol message such as DLInformationTransfer comprises the Additional-NAS-Indication. Examples of the details on how this information can be added to these messages are given below.

The information may be added into RRC signaling as shown for example in FIG. 10. The information may alternatively be conveyed in the NAS protocol itself between the wireless device 10 and the core network node 16, which is then carried over signalling radio bearers on the air interface or over the signalling connections on the CN-RAN interface, and the receiving communication device 112, such as the radio network node 12, may have to 'sniff'/inspect the NAS PDUs to understand which NAS PDU belongs to which NAS connection.

In another variant, the "Additional-NAS-indication" is communicated to the radio network node 12 from the wireless device 10 during RRC connection establishment. The value indicated from the wireless device 10 may be controlled by the radio network node 12, for example by having allowed set of "Additional-NAS-indication" configured for each network slice. Once the CN/MME indicates that the wireless device 10 is allowed to connect to a specific network slice, this information can be used especially in the case when the wireless device 10 is only connected to a single network slice.

With the above additions to the air interface signalling and/or the CN-RAN interface signalling, it becomes possible for the RAN/CN to acquire an insight into how much signaling each network slice generates over the air and/or CN-RAN interface and adapt resource realization strategies accordingly. Today it is only possible to have a quite granular/detailed view of traffic for what regards the user plane data, but not for e.g. air interface signaling.

Embodiments herein enable the receiving communication device 112, e.g. a RAN node such as the radio network node 12, to have more insight into the importance and priority of traffic in a Signalling connection such as a SRB, in particular NAS signaling in e.g. SRB2, in scenarios where different NAS PDUs may be associated for example with different network slices and the wireless device 10 may be connected to more than one network slice at a time. With this knowledge the receiving communication device 112 may decide to adapt its resource utilization strategies to take into consideration signalling traffic in a differentiated way, and this represents a tool for e.g. the RAN to guarantee fulfillment of the network slice SLA. Furthermore, with an indication of priority of a NAS PDU, the receiving communication device 112 would be able to apply differentiated treatment of NAS PDUs.

Figure 11:
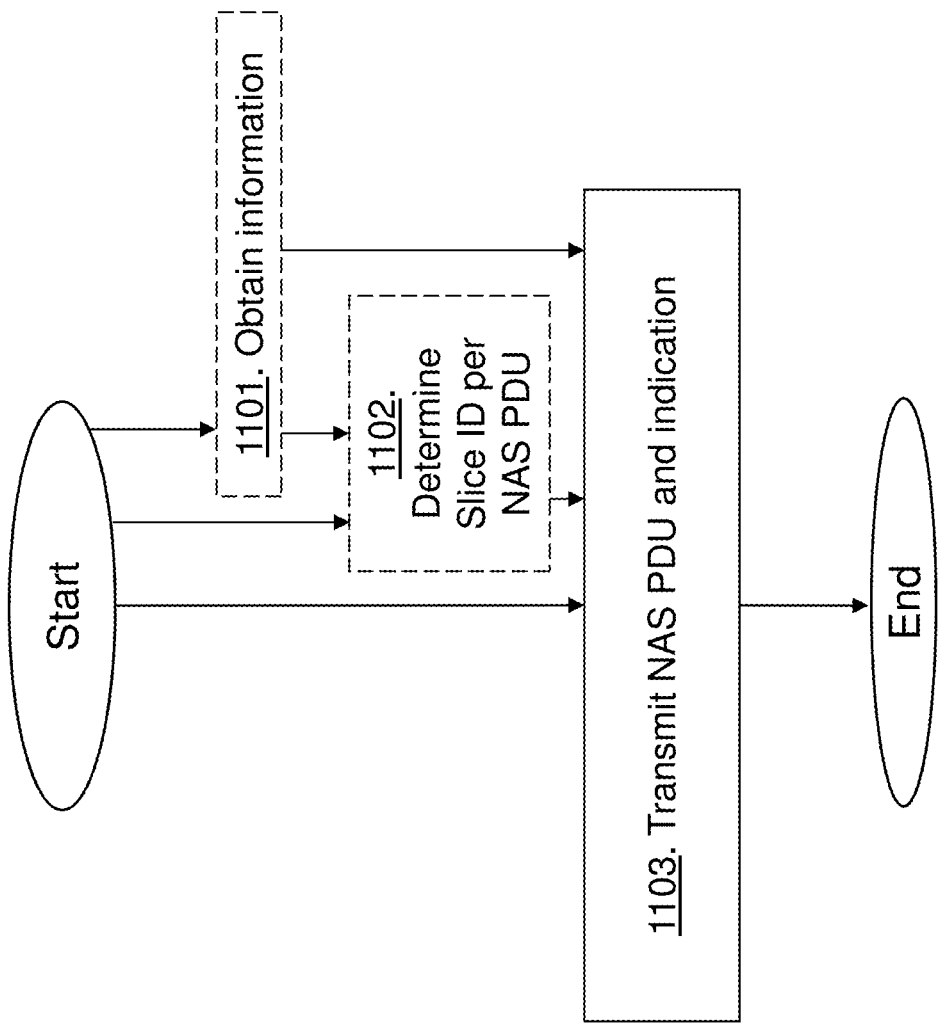
FIG. 11 is a schematic flowchart depicting a method performed by a transmitting communication device according to embodiments herein.

FIG. 11 is a schematic flowchart depicting a method performed by the transmitting communication device 110, such as the wireless device 10 or the network node 15 such as the radio network node 12 or the core network node 16, for handling communication for the wireless device 10 in the communication network 1. The communication network 1 comprises one or more networks comprising partitioned sets of functionalities wherein the first set of functionalities belongs to the first network slice supporting the wireless device 10. The first set of functionalities is separated from another set of functionalities out of the total set of functionalities in the one or more networks.

Action 1101. The transmitting communication device 110 may obtain information for generating the indication from the core network node 16 or from the wireless device 10. For example, referring to the case when the transmitting communication device 110 is the radio network node 12, the radio network node 12 may construct the "Additional-NAS-indication" based on information available on an S1-MME interface i.e. sent from the core network node 16 such as an MME. Following lists some possible examples:

- When the S1-MME interface is established, the core network node 16 may provide information in the S1AP S1 SETUP RESPONSE message. In one example this consists of the core network node 16 indicating a single "supported network slice" or "supported service" that the radio network node 12 can use to select for example a related priority level for NAS signaling from this network slice. The selection may be based on preconfigured associations between slice identifiers and priority levels to be used for NAS PDUs. In still another example the core network node 16 indicates the related priority level for NAS signaling from this core network node/network slice. In yet another example the core network node 16 supports multiple network slices. In this case the core network node 16 indicates the associations between slice identifiers and priority levels for all supported network slices, to be used by the radio network node 12 when receiving an indication of the network slice used for an S1AP connection or individual NAS signaling messages, as described below. In yet a further example the core network node 16 supports multiple services. In this case the core network node 16 indicates the associations between the supported services and priority levels for all supported services, to be used by the radio network node 12 when receiving an indication of the service used for an S1AP connection or individual NAS signaling messages, as described below.

When the UE context is created in the radio network node 12, the core network node 16 may provide information in the S1AP INITIAL CONTEXT SETUP REQUEST message. In one example this consists of the core network node 16 indicating a network slice information in this message and the radio network node 12 can use the network slice information to select for example a related priority level for NAS signaling for this UE context. The selection may be based on preconfigured associations between slice identifiers and priority levels to be used for NAS PDUs. The associations between slice identifiers and priority levels or services and priority levels to be used for NAS PDUs could also have been received when establishing the S1AP interface, as described above. In still another example the core network node 16 indicates the related priority level for NAS signaling related to this UE context.

When a NAS PDU is sent to the wireless device 10 as receiving communication device, the core network node 16 may provide information in the S1AP DOWNLINK NAS TRANSPORT message. This case can happen in any S1AP message that can carry a NAS-PDU. In one example this consists of the core network node 16 indicating a priority in this message and the radio network node 12 can use this information either locally in the radio network node 12 as well as to build the "Additional-NAS-indication". In another example the core network node 16 may indicate the network slice or service used for the NAS PDU, to be used to build the "Additional-NAS-indication". This means that every NAS PDU received may be associated with e.g. a different priority level.

When a NAS PDU is sent to core network node 16, the wireless device 10 may provide information to the radio network node 12 using, for example, RRC messages such as ULInformationTransfer message.

Action 1102. The transmitting communication device 110 may determine an identity of the first network slice for the NAS PDU. For example, the transmitting communication device 110 may determine identity of the first network slice based on the obtained information.

Action 1103. The transmitting communication device 110 transmits the NAS PDU and the indication over the signalling connection carrying NAS PDUs, such as the SRB or the CN-RAN interface, to the receiving communication device 112. The indication indicates that the NAS PDU is associated with the first network slice. The indication may be signalled in a radio resource control protocol over an air interface and/or signalled in a protocol over an interface between the radio network node 12 and the core network node 16 of the communication network 1. The indication may be signalled in a NAS protocol between the wireless device 10 and the core network node 16 of the communication network 1. The indication may be represented by a priority level, a Slice ID, an identifier associated with the wireless device being connected to one or multiple Core Network instances due to network slicing; a description of a service the NAS PDUs in question is mapped to; or information constructed on basis of other information acquired from the wireless device or from a Core Network during connection setup/reconfiguration. Hence, the indication indicates the first network slice associated with the NAS PDU(s) so that the receiving communication device can distinguish multiple NAS streams belonging to separate network slices. In some embodiments, the transmitting communication device 110, such as the wireless device 10, may be associated with multiple "Additional-NAS-indications" for example for different connections to different network slices. These multiple "Additional-NAS-indications" may be combined so that the value indicating the highest value, e.g. priority, is used for all the NAS connections of the wireless device 10 and NAS PDUs. This may be feasible as the amount of NAS signaling is likely be limited and the possible "free ride" for the other NAS signaling with lower value, e.g. priority, may not have any significant impact on the communication network.

Figure 12:
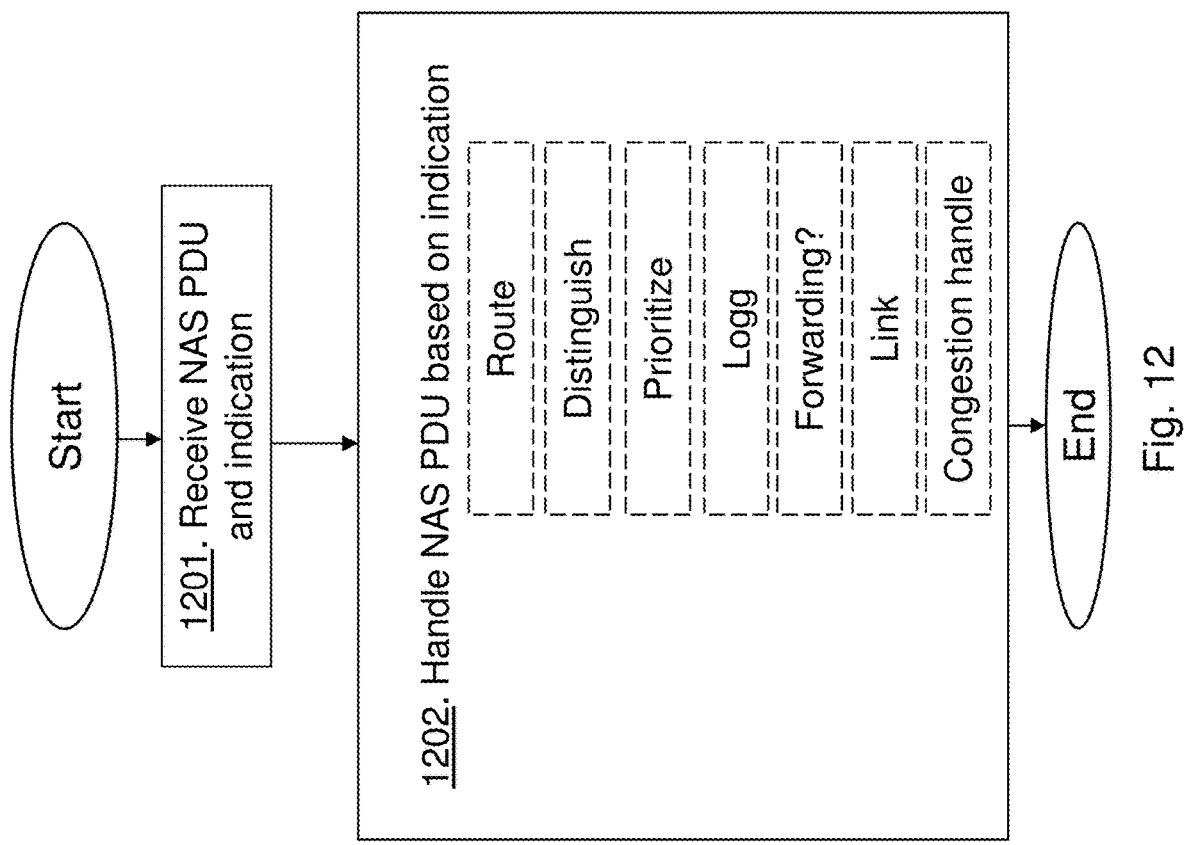
FIG. 12 is a schematic flowchart depicting a method performed by a receiving communication device according to embodiments herein.

FIG. 12 is a schematic flowchart depicting a method performed by the receiving communication device 112, such as the network node 15, e.g. the radio network node 12 or the core network node 16, or the wireless device 10, for handling communication for the wireless device 10 in the communication network 1. The communication network 1 comprises one or more networks comprising partitioned sets of functionalities wherein the first set of functionalities belongs to the first network slice supporting the wireless device 10. The first set of functionalities is separated from another set of functionalities out of the total set of functionalities in the one or more networks.

Action 1201. The receiving communication device 112 receives from the transmitting communication device 110, the NAS PDU and the indication over the signalling connection carrying NAS PDUs, which indication indicates that the NAS PDU is associated with the first network slice. The indication may be received in the radio resource control protocol over the air interface and/or received in the protocol over the interface between the radio network node 12 and the core network node 16 of the communication network 1. The indication may be received in the Non Access Stratum protocol between the wireless device 10 and the core network node 16 of the communication network. Thus, when the radio network node 12 or the wireless device 10 is the receiving communication device 112 the indication may be received in different RRC messages. When the core network node 16 is the receiving communication device 112 the indication may be received in different S1AP messages from the radio network node 12, e.g. S1AP INITIAL UE MESSAGE or S1AP UPLINK NAS TRANSPORT.

Action 1202. The receiving communication device 112 handles the received NAS PDU taking the received indication into account. For example, the receiving communication device 112 may handle the received NAS PDU by routing the received NAS PDU to a network node based on the received indication. The receiving communication device 112 may handle the received NAS PDU by distinguishing the NAS PDU from a different NAS PDU associated with a different network slice. The receiving communication device 112 may handle the NAS PDU by prioritizing the received NAS PDU over other received NAS PDUs based on the received indication. The receiving communication device 112 may handle the NAS PDU by logging received NAS PDUs per network slice. The receiving communication device 112 may handle the NAS PDU by forwarding or not forwarding the received NAS PDU to higher layer based on the received indication. The receiving communication device 112 may handle the NAS PDU by linking NAS PDUs associated with the first network slice to a certain priority handling. The receiving communication device 112 may handle the NAS PDU by congestion handling the received NAS PDU based on the received indication.

When "Additional-NAS-indication" is sent from the radio network node 12 to the wireless device 10, the "Additional-NAS-indication" may also be used in some cases for uplink handling and prioritization of NAS PDUs by the wireless device 10. The indication sent from the radio network node 12 to the wireless device 10 may indicate that a specific NAS procedure has for example a specific priority and then the wireless device 10 can apply the same priority in the uplink for other NAS messages related to the same NAS procedure. One specific example is a case when multiple NAS procedures would be running towards the wireless device 10 with different priorities.

The receiving communication device 112 may in some embodiment e.g. being the radio network node 12, forward the indication used over the air interface in the uplink towards the core network node 16. There are also different possibilities for handling NAS PDUs in downlink. When the receiving communication device 112 has retrieved the Additional-NAS-indication" for a downlink NAS PDU, e.g. the radio network node 12 receiving it from the core network node 16, the receiving communication device 112 may use it internally when deciding when to send the NAS PDU to the wireless device 10. Then the receiving communication device 112 may also forward the indication to the wireless device 10 but this is really not necessary in all embodiments. The forwarding is mainly important if the wireless device 10 can also use the information for example in internal handling of NAS PDUs, or if it can be used for other NAS PDUs, for example belonging to the same NAS procedure.

In some embodiments, if different NAS signalling requires more or less robustness efforts by RAN, one robustness effort would be to use the concept of RRC diversity but only for certain "Additional NAS indication". RRC diversity means that the wireless device is connected to the radio network node via at least two different air interface instances, for example either via two air interfaces of same type or via two air interfaces of different types. RRC diversity can be implemented for example based on evolution of existing Dual Connectivity or Carrier Aggregation concepts. In this RRC diversity case a RRC message is sent by the transmitting communication device 110 using multiple air interfaces and the receiving communication device 112 reacts as soon as a first copy of the RRC message reaches the receiving communication device 112 and the receiving communication device 112 discards the other copies of the same message coming another way. Also it could be so that specific "Additional NAS indication" needs to have priority to be sent over certain RAT's if available, for example to allow for lowest possible latency when available. The opposite is also true that a certain "Additional NAS indication" may indicate to the receiving communication device 112 that it is ok to use a high latency RAT.

The figures below outline how the information could be added to the RRC protocol, or equivalent radio resource control protocol in a new 5G RAT, the addition is the italic bold text lines.

```
DLInformationTransfer message
-- ASN1START
DLInformationTransfer ::=           SEQUENCE {
    rrc-TransactionIdentifier           RRC-TransactionIdentifier,
    criticalExtensions                  CHOICE {
        c1                              CHOICE {
            dlInformationTransfer-r8
            DLInformationTransfer-r8-IEs,
            spare3 NULL, spare2 NULL, spare1 NULL
        },
        criticalExtensionsFuture        SEQUENCE { }
    }
}
DLInformationTransfer-r8-IEs ::=    SEQUENCE {
    dedicatedInfoType                   CHOICE {
        dedicatedInfoNAS                DedicatedInfoNAS,
        dedicatedInfoCDMA2000-1XRTT
        DedicatedInfoCDMA2000,
        dedicatedInfoCDMA2000-HRPD      DedicatedInfoCDMA2000
    },
    nonCriticalExtension                DLInformationTransfer-v8a0-
IEs    OPTIONAL
}
DLInformationTransfer-v8a0-IEs ::= SEQUENCE {
    lateNonCriticalExtension            OCTET STRING
    OPTIONAL,
    nonCriticalExtension                DLInformationTransfer-vxyx-
IEs    OPTIONAL
}
DLInformationTransfer-vxyx-IEs ::= SEQUENCE {
    additionalNASIndication             AdditionalNASIndication
    OPTIONAL,
    nonCriticalExtension                SEQUENCE {}           OPTIONAL
}
-- ASN1STOP ULInformationTransfer message
-- ASN1START
ULInformationTransfer ::=           SEQUENCE {
    criticalExtensions                  CHOICE {
        c1                              CHOICE {
            ulInformationTransfer-r8
            ULInformationTransfer-r8-IEs,
            spare3 NULL, spare2 NULL, spare1 NULL
        },
        criticalExtensionsFuture        SEQUENCE { }
    }
}
ULInformationTransfer-r8-IEs ::=    SEQUENCE {
    dedicatedInfoType    CHOICE {
        dedicatedInfoNAS                DedicatedInfoNAS,
        dedicatedInfoCDMA2000-1XRTT
        DedicatedInfoCDMA2000,
        dedicatedInfoCDMA2000-HRPD      DedicatedInfoCDMA2000
    },
    nonCriticalExtension                ULInformationTransfer-v8a0-
IEs           OPTIONAL
}
ULInformationTransfer-v8a0-IEs ::= SEQUENCE {
    lateNonCriticalExtension            OCTET STRING
    OPTIONAL,
    nonCriticalExtension                ULInformationTransfer-vxyx-
IEs    OPTIONAL
}
ULInformationTransfer-vxyx-IEs ::= SEQUENCE {
    additionalNASIndication             AdditionalNASIndication
    OPTIONAL,
    nonCriticalExtension                SEQUENCE {}           OPTIONAL
}
-- ASN1STOP
```

Figure 13:
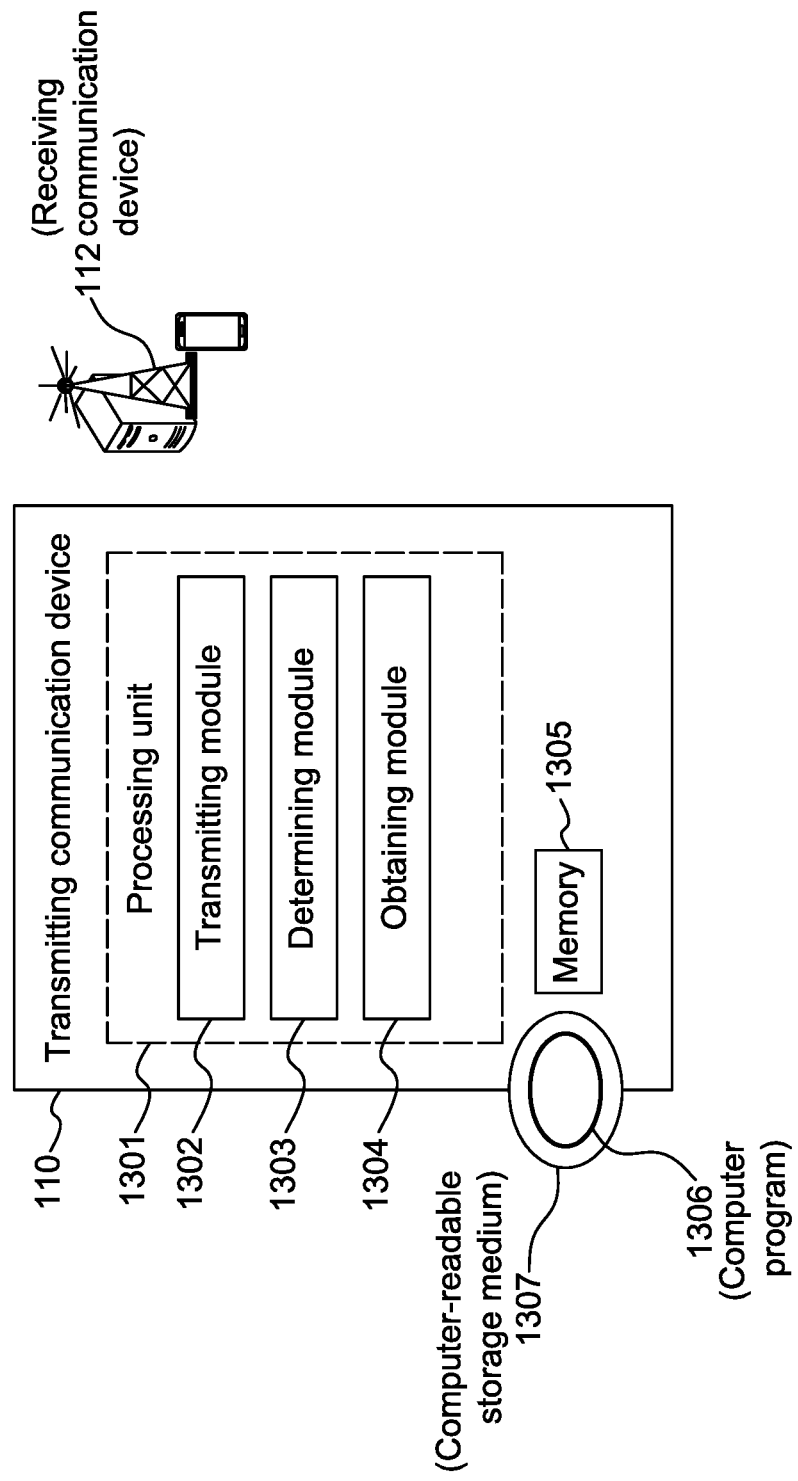
FIG. 13 is a block diagram depicting a transmitting communication device according to embodiments herein.

FIG. 13 is a block diagram depicting the transmitting communication device 110, e.g. the wireless device 10, the radio network node 12 and/or the core network node 16, for handling communication for the wireless device 10 in the communication network 1 according to embodiments herein. As stated above, the communication network 1 comprises one or more networks comprising partitioned sets of functionalities wherein the first set of functionalities belongs to the first network slice supporting the wireless device 10, and which first set of functionalities is separated from another set of functionalities out of a total set of functionalities in the one or more networks.

The transmitting communication device 110 may comprise a processing unit 1301, such as one or more processors, configured to perform the methods herein.

The transmitting communication device 110 is configured to transmit the NAS PDU, and the indication over the signalling connection carrying NAS PDUs, to the receiving communication device 112, e.g. the core network node 16, the radio network node 12 and/or the wireless device 10. The indication indicates that the NAS PDU is associated with the first network slice. The transmitting communication device 110 may comprise a transmitting module 1302. The processing unit 1301 and/or the transmitting module 1302 may be configured to transmit the NAS PDU, and the indication over the signalling connection carrying NAS PDUs, to the receiving communication device 112.

The transmitting communication device 110, the processing unit 1301 and/or the transmitting module 1302 may be configured to transmit the indication in the radio resource control protocol over the air interface and/or in the protocol over the interface between the radio network node 12 and the core network node 16 of the communication network 1. The transmitting communication device 110, the processing unit 1301 and/or the transmitting module 1302 may be configured to transmit the indication in the Non Access Stratum protocol between the wireless device 10 and the core network node 16 of the communication network. The indication may be represented by a priority level, a Slice ID, an identifier associated with the wireless device being connected to one or multiple Core Network instances due to network slicing; a description of a service the NAS PDUs in question is mapped to; or information constructed on basis of other information acquired from the wireless device or from a Core Network during connection setup/reconfiguration.

The transmitting communication device 110 may be configured to determine the identity of the first network slice for the NAS PDU. The transmitting communication device 110 may comprise a determining module 1303. The processing unit 1301 and/or the determining module 1303 may be configured to determine the identity of the first network slice for the NAS PDU.

In some embodiments the transmitting communication device is a radio network node 12 and is configured to obtain information for generating the indication from the core network node 16 or from the wireless device 10. The transmitting communication device 110 may comprise an obtaining module 1304. The processing unit 1301 and/or the obtaining module 1304 may be configured to obtain information for generating the indication from the core network node 16 or from the wireless device 10.

The transmitting communication device 110 further comprises a memory 1305. The memory comprises one or more units to be used to store data on, such as sets of functionalities, information, identities of network slices, indications, NAS signalling mappings to network slices, applications to perform the methods disclosed herein when being executed, and similar.

The methods according to the embodiments described herein for the transmitting communication device 110 are respectively implemented by means of e.g. a computer program 1306 or a computer program product, comprising instructions, i.e., software code portions, which, when executed on at least one processor, cause the at least one processor to carry out the actions described herein, as performed by the transmitting communication device 110. The computer program 1306 may be stored on a computer-readable storage medium 1307, e.g. a disc or similar. The computer-readable storage medium 1307, having stored thereon the computer program, may comprise the instructions which, when executed on at least one processor, cause the at least one processor to carry out the actions described herein, as performed by the transmitting communication device 110. In some embodiments, the computer-readable storage medium may be a non-transitory computer-readable storage medium.

Figure 14:
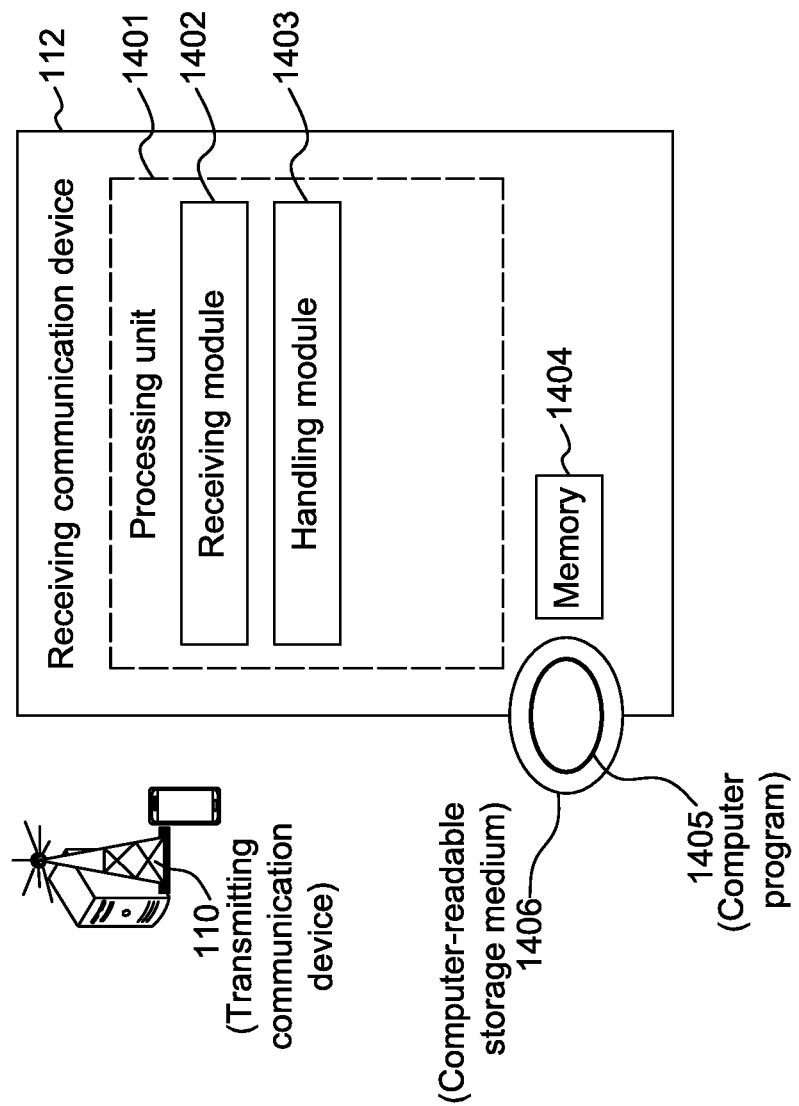
FIG. 14 is a block diagram depicting a receiving communication device according to embodiments herein.

FIG. 14 is a block diagram depicting the receiving communication device 112, such as the wireless device 10, the radio network node 12 and/or the core network node 16, for handling communication for the wireless device 10 in the communication network 1 according to embodiments herein. The communication network 1 comprises one or more networks comprising partitioned sets of functionalities wherein the first set of functionalities belongs to the first network slice supporting the wireless device 10, and which first set of functionalities is separated from another set of functionalities out of the total set of functionalities in the one or more networks.

The receiving communication device 112 may comprise a processing unit 1401 such as one or more processors configured to perform the methods herein.

The receiving communication device 112 is configured to receive from the transmitting communication device 110, the NAS PDU and the indication over the signalling connection carrying NAS PDUs. The indication indicates that the NAS PDU is associated with the first network slice. The receiving communication device 112 may comprise a receiving module 1402. The processing unit 1401 and/or the receiving module 1402 may be configured to receive from the transmitting communication device 110, the NAS PDU and the indication over the signalling connection carrying NAS PDUs.

The receiving communication device 112 is configured to handle the received NAS PDU taking the received indication into account. The receiving communication device 112 may comprise a handling module 1403. The processing unit 1401 and/or the handling module 1403 may be configured to handle the received NAS PDU taking the received indication into account.

The receiving communication device 112, the processing unit 1401 and/or the handling module 1403 may be configured to handle the received NAS PDU by being configured to route the received NAS PDU to a network node based on the received indication.

The receiving communication device 112, the processing unit 1401 and/or the handling module 1403 may be configured to handle the received NAS PDU by being configured to distinguish the NAS PDU from a different NAS PDU associated with a different network slice.

The receiving communication device 112, the processing unit 1401 and/or the handling module 1403 may be configured to handle the received NAS PDU by being configured to prioritize the received NAS PDU over other received NAS PDUs based on the received indication.

The receiving communication device 112, the processing unit 1401 and/or the handling module 1403 may be configured to handle the received NAS PDU by being configured to log received NAS PDUs per network slice.

The receiving communication device 112, the processing unit 1401 and/or the handling module 1403 may be configured to handle the received NAS PDU by being configured to forward or not to forward the received NAS PDU to higher layer based on the received indication.

The receiving communication device 112, the processing unit 1401 and/or the handling module 1403 may be configured to handle the received NAS PDU by being configured to link NAS PDUs associated with the first network slice to a certain priority handling.

The receiving communication device 112, the processing unit 1401 and/or the handling module 1403 may be configured to handle the received NAS PDU by being configured to congestion handle the received NAS PDU based on the received indication.

The receiving communication device 112, the processing unit 1401 and/or the receiving module 1402 may be configured to receive the indication in the radio resource control protocol over the air interface and/or in the protocol over the interface between the radio network node 12 and the core network node 16 of the communication network 1.

The receiving communication device 112, the processing unit 1401 and/or the receiving module 1402 may be configured to receive the indication in the Non Access Stratum protocol between the wireless device 10 and the core network node 16 of the communication network.

The receiving communication device 112 further comprises a memory 1404. The memory comprises one or more units to be used to store data on, such as sets of functionalities, indications, identities of network slices, handling information, connection mappings to network slices, applications to perform the methods disclosed herein when being executed, and similar.

The methods according to the embodiments described herein for the receiving communication device 112 are respectively implemented by means of e.g. a computer program 1405 or a computer program product, comprising instructions, i.e., software code portions, which, when executed on at least one processor, cause the at least one processor to carry out the actions described herein, as performed by the receiving communication device 112. The computer program 1405 may be stored on a computer-readable storage medium 1406, e.g. a disc or similar. The computer-readable storage medium 1406, having stored thereon the computer program, may comprise the instructions which, when executed on at least one processor, cause the at least one processor to carry out the actions described herein, as performed by the receiving communication device 112. In some embodiments, the computer-readable storage medium may be a non-transitory computer-readable storage medium.

Embodiments herein relate to a network with network slices i.e. a (core or RAN or both) network with partitioned sets of functionalities where the first network slice node 13 supports the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a transmitting communication device for handling communication for a wireless device in a communication network, wherein the communication network comprises one or more networks comprising partitioned sets of functionalities, wherein a first set of functionalities out of a total set of functionalities belongs to a first network slice supporting the wireless device, wherein the first set of functionalities is separated from another set of functionalities out of the total set of functionalities in the one or more networks, and wherein the transmitting communication device is a radio network node, the method comprising:

obtaining information from a core network node when a Non Access Stratum Protocol Data Unit (NAS PDU) is sent to the wireless device, or from the wireless device when the NAS PDU is sent to the core network node, wherein the obtained information indicates that the first network slice is a supported network slice for the NAS PDU;

selecting a priority level of the NAS PDU based on the obtained information;

generating an indication based on the obtained information and the selected priority level of the NAS PDU; and transmitting the NAS PDU and the indication over a signalling connection carrying NAS PDUs, to a receiving communication device, wherein the indication indicates that the NAS PDU is associated with the first network slice.

2. The method according to claim 1, wherein the indication is signalled in at least one of: a radio resource control protocol over an air interface; and a protocol over an interface between the radio network node and the core network node of the communication network.

3. The method according to claim 1, wherein the indication is signalled in a Non Access Stratum protocol between the wireless device and the core network node of the communication network.

4. The method according to claim 1, wherein the indication is represented by one or more of: the priority level; a Slice ID; an identifier associated with the wireless device being connected to one or multiple Core Network instances due to network slicing; a description of a service the NAS PDUs in question is mapped to; and information constructed on basis of other information acquired from the wireless device or from a Core Network during connection setup or reconfiguration.

5. The method according to claim 1, further comprising: determining an identity of the first network slice for the NAS PDU.

6. A method performed by a receiving communication device for handling communication for a wireless device in a communication network, wherein the communication network comprises one or more networks comprising partitioned sets of functionalities, wherein a first set of functionalities out of a total set of functionalities belongs to a first network slice supporting the wireless device, and wherein the first set of functionalities is separated from another set of functionalities out of the total set of functionalities in the one or more networks, the method comprising:
receiving, from a transmitting communication device, a Non Access Stratum Protocol Data Unit (NAS PDU) and an indication over a signalling connection carrying NAS PDUs, wherein the indication indicates that the received NAS PDU is associated with the first network slice; and
handling the received NAS PDU taking the received indication into account, wherein the handling comprises prioritizing the received NAS PDU over other received NAS PDUs based on the received indication.

7. The method according to claim 6, wherein the handling further comprises routing the received NAS PDU to a network node based on the received indication.

8. The method according to claim 6, wherein the handling further comprises distinguishing the received NAS PDU from a different received NAS PDU associated with a different network slice.

9. The method according to claim 6, wherein the handling further comprises logging the received NAS PDUs per network slice.

10. The method according to claim 6, wherein the handling further comprises whether or not to forward the received NAS PDU to a higher layer based on the received indication.

11. The method according to claim 6, wherein the handling further comprises linking the received NAS PDUs associated with the first network slice to a certain priority handling.

12. The method according to claim 6, wherein the handling further comprises congestion handling the received NAS PDU based on the received indication.

13. The method according to claim 6, wherein the indication is received in at least one of: a radio resource control protocol over an air interface; and a protocol over an interface between a radio network node and a core network node of the communication network.

14. The method according to claim 6, wherein the indication is received in a Non Access Stratum protocol between the wireless device and a core network node of the communication network.

15. A transmitting communication device for handling communication for a wireless device in a communication network, wherein the communication network comprises one or more networks comprising partitioned sets of functionalities, wherein a first set of functionalities out of a total set of functionalities belongs to a first network slice supporting the wireless device, wherein the first set of functionalities is separated from another set of functionalities out of the total set of functionalities in the one or more networks, and wherein the transmitting communication device is a radio network node, the transmitting communication device comprising:
a processing unit; and
a memory containing instructions executable by the processing unit, in which the instructions, when executed by the processing unit, cause the transmitting communication device to perform operations to:
obtain information from a core network node when a Non Access Stratum Protocol Data Unit (NAS PDU) is sent to the wireless device or from the wireless device when the NAS PDU is sent to the core network node, wherein the obtained information indicates that the first network slice is a supported network slice for the NAS PDU;
select a priority level of the NAS PDU based on the obtained information;
generate an indication based on the obtained information and the selected priority level of the NAS PDU; and
transmit the NAS PDU and the indication over a signalling connection carrying NAS PDUs, to a receiving communication device, wherein the indication indicates that the NAS PDU is associated with the first network slice.

16. The transmitting communication device according to claim 15, wherein the instructions, when executed by the processing unit, cause the transmitting communication device to transmit the indication in at least one of: a radio resource control protocol over an air interface; and a protocol over an interface between the radio network node and the core network node of the communication network.

17. The transmitting communication device according to claim 15, wherein the instructions, when executed by the processing unit, cause the transmitting communication device to transmit the indication in a Non Access Stratum protocol between the wireless device and the core network node of the communication network.

18. The transmitting communication device according to claim 15, wherein the indication is represented by one or more of: the priority level; a Slice ID; an identifier associated with the wireless device being connected to one or multiple Core Network instances due to network slicing; a description of a service the NAS PDUs in question is mapped to; and information constructed on basis of other information acquired from the wireless device or from a Core Network during connection setup or reconfiguration.

19. The transmitting communication device according to claim 15, wherein the instructions, when executed by the processing unit, further cause the transmitting communication device to determine an identity of the first network slice for the NAS PDU.

20. A receiving communication device for handling communication for a wireless device in a communication network, wherein the communication network comprises one or more networks comprising partitioned sets of functionalities, wherein a first set of functionalities out of a total set of functionalities belongs to a first network slice supporting the wireless device, and wherein the first set of functionalities is separated from another set of functionalities out of the total set of functionalities in the one or more networks, the receiving communication device comprising:
- a processing unit; and
- a memory containing instructions executable by the processing unit, in which the instructions, when executed by the processing unit, cause the receiving communication device to perform operations to:
  - receive, from a transmitting communication device, a Non Access Stratum Protocol Data Unit (NAS PDU) and an indication over a signalling connection carrying NAS PDUs, wherein the indication indicates that the received NAS PDU is associated with the first network slice; and
  - handle the received NAS PDU taking the received indication into account, wherein the received NAS PDU is handled by prioritizing the received NAS PDU over other received NAS PDUs based on the received indication.

21. The receiving communication device according to claim 20, wherein the instructions, when executed by the processing unit, cause the receiving communication device to handle the received NAS PDU further by routing the received NAS PDU to a network node based on the received indication.

22. The receiving communication device according to claim 20, wherein the instructions, when executed by the processing unit, cause the receiving communication device to handle the received NAS PDU further by distinguishing the received NAS PDU from a different received NAS PDU associated with a different network slice.

23. The receiving communication device according to claim 20, wherein the instructions, when executed by the processing unit, cause the receiving communication device to handle the received NAS PDU further by logging the received NAS PDUs per network slice.

24. The receiving communication device according to claim 20, wherein the instructions, when executed by the processing unit, cause the receiving communication device to handle the received NAS PDU further by forwarding or not forwarding the received NAS PDU to a higher layer based on the received indication.

25. The receiving communication device according to claim 20, wherein the instructions, when executed by the processing unit, cause the receiving communication device to handle the received NAS PDU further by linking the received NAS PDUs associated with the first network slice to a certain priority handling.

26. The receiving communication device according to claim 20, wherein the instructions, when executed by the processing unit, cause the receiving communication device to handle the received NAS PDU further by congestion handling the received NAS PDU based on the received indication.

27. The receiving communication device according to claim 20, wherein the instructions, when executed by the processing unit, cause the receiving communication device to receive the indication in at least one of: a radio resource control protocol over an air interface; and a protocol over an interface between a radio network node and a core network node of the communication network.

28. The receiving communication device according to claim 20, wherein the instructions, when executed by the processing unit, cause the receiving communication device to receive the indication in a Non Access Stratum protocol between the wireless device and a core network node of the communication network.

29. A non-transitory computer-readable storage medium, having stored thereon a computer program comprising instructions which, when executed on at least one processor, cause a transmitting communication device to perform operations for handling communication for a wireless device in a communication network, wherein the communication network comprises one or more networks comprising partitioned sets of functionalities, wherein a first set of functionalities out of a total set of functionalities belongs to a first network slice supporting the wireless device, wherein the first set of functionalities is separated from another set of functionalities out of the total set of functionalities in the one or more networks, wherein the transmitting communication device is a radio network node, and wherein the operations comprise:
- obtaining information from a core network node when a Non Access Stratum Protocol Data Unit (NAS PDU) is sent to the wireless device, or from the wireless device when the NAS PDU is sent to the core network node, wherein the obtained information indicates that the first network slice is a supported network slice for the NAS PDU;
- selecting a priority level of the NAS PDU based on the obtained information;
- generating an indication based on the obtained information and the selected priority level of the NAS PDU; and
- transmitting the NAS PDU and the indication over a signalling connection carrying NAS PDUs, to a receiving communication device, wherein the indication indicates that the NAS PDU is associated with the first network slice.

30. A non-transitory computer-readable storage medium, having stored thereon a computer program comprising instructions which, when executed on at least one processor, cause a receiving communication device to perform operations for handling communication for a wireless device in a communication network, wherein the communication network comprises one or more networks comprising partitioned sets of functionalities, wherein a first set of functionalities out of a total set of functionalities belongs to a first network slice supporting the wireless device, and wherein the first set of functionalities is separated from another set of functionalities out of the total set of functionalities in the one or more networks, and wherein the operations comprise:
- receiving, from a transmitting communication device, a Non Access Stratum Protocol Data Unit (NAS PDU) and an indication over a signalling connection carrying NAS PDUs, wherein the indication indicates that the received NAS PDU is associated with the first network slice; and
- handling the received NAS PDU taking the received indication into account, wherein the handling comprises prioritizing the received NAS PDU over other received NAS PDUs based on the received indication.

* * * * *